United States Patent
Wheeler

(10) Patent No.: US 11,063,664 B2
(45) Date of Patent: Jul. 13, 2021

(54) WIRELESS MOBILE ENTERTAINMENT SYSTEM

(71) Applicant: Christopher J. Wheeler, Stockton, CA (US)

(72) Inventor: Christopher J. Wheeler, Stockton, CA (US)

( * ) Notice: Subject to any disclaimer, the term of this patent is extended or adjusted under 35 U.S.C. 154(b) by 0 days.

(21) Appl. No.: 16/422,421

(22) Filed: May 24, 2019

(65) Prior Publication Data

US 2019/0363795 A1 Nov. 28, 2019

Related U.S. Application Data

(60) Provisional application No. 62/676,290, filed on May 25, 2018.

(51) Int. Cl.
| | |
|---|---|
| *H04B 10/114* | (2013.01) |
| *H04B 5/00* | (2006.01) |
| *H04H 20/72* | (2008.01) |
| *H04H 20/69* | (2008.01) |

(52) U.S. Cl.
CPC ....... *H04B 10/1143* (2013.01); *H04B 5/0006* (2013.01); *H04H 20/69* (2013.01); *H04H 20/72* (2013.01); *H04B 2210/006* (2013.01)

(58) Field of Classification Search
CPC .......... H04R 2420/07; H04R 2227/003; H04R 27/00; H04R 5/04; H04H 20/69; H04H 20/71

See application file for complete search history.

(56) References Cited

U.S. PATENT DOCUMENTS

| | | | | |
|---|---|---|---|---|
| 10,394,521 | B1* | 8/2019 | Cramer | H03G 3/02 |
| 10,412,567 | B1* | 9/2019 | Tong | H04R 1/1025 |
| 2005/0181756 | A1* | 8/2005 | Lin | H04H 20/71 455/344 |
| 2007/0123171 | A1* | 5/2007 | Slamka | H04M 1/6066 455/66.1 |
| 2007/0213083 | A1* | 9/2007 | Shaanan | H04H 20/71 455/500 |
| 2008/0212971 | A1* | 9/2008 | Shaanan | H04B 10/1141 398/130 |
| 2008/0242228 | A1* | 10/2008 | Saito | H04R 1/1091 455/41.2 |
| 2010/0284389 | A1* | 11/2010 | Ramsay | H04N 21/42684 370/338 |
| 2010/0292818 | A1* | 11/2010 | Ramsay | G06F 3/165 700/94 |
| 2012/0050198 | A1* | 3/2012 | Cannon | A63F 13/42 345/173 |
| 2015/0003630 | A1* | 1/2015 | Qian | H04W 4/80 381/79 |
| 2015/0195650 | A1* | 7/2015 | Vogt | H04R 27/00 381/77 |

(Continued)

*Primary Examiner* — Tanya T Motsinger

(57) ABSTRACT

A novel device, system and method is disclosed for transmitting audio from a wireless audio device to wireless headphones and/or speakers (or combination thereof) via a combination of digital and analog, one and/or two way, radio frequency and infrared wireless technologies for the purposes of providing entertainment for one or more listeners using the headphones or speakers with internal or external battery or power supply and one or more integrated power connections for the wireless audio device or other devices.

6 Claims, 2 Drawing Sheets

Drawing Remarks: The following revisions have been made to match the drawing labels of FIG. 1 and FIG. 2 to revisions to the 10-3-2020 utility patent application:
- Item 40, Charging/Power Connection was Item 40, USB Power Connection (optional)
- Item 130, Charging/Power Subsystem was Item 130, USB Charging Subsystem (optional)

(56) References Cited

U.S. PATENT DOCUMENTS

| | | | |
|---|---|---|---|
| 2016/0014513 A1* | 1/2016 | McCoy | H04R 3/12 |
| | | | 381/79 |
| 2016/0041808 A1* | 2/2016 | Pelland | H04R 3/00 |
| | | | 381/123 |
| 2017/0048613 A1* | 2/2017 | Smus | G06F 1/1694 |
| 2017/0288625 A1* | 10/2017 | Kim | H04S 7/301 |
| 2017/0295422 A1* | 10/2017 | Chalmers | G06F 3/165 |
| 2019/0363795 A1* | 11/2019 | Wheeler | H04H 20/72 |
| 2020/0059723 A1* | 2/2020 | Nakamura | H04R 5/02 |

* cited by examiner

Drawing Remarks: The following revisions have been made to match the drawing labels of FIG. 1 and FIG. 2 to revisions to the 10-3-2020 utility patent application:
- Item 40, Charging/Power Connection was Item 40, USB Power Connection (optional)
- Item 130, Charging/Power Subsystem was Item 130, USB Charging Subsystem (optional)

WIRELESS MOBILE ENTERTAINMENT SYSTEM

This application claims the benefit of priority to U.S. Provisional Patent Application Ser. No. 62/676,290 filed May 25, 2018, which is incorporated by reference in its' entirety. This application is a revision of the U.S. patent application Ser. No. 16/422,421 filed May 24, 2019.

FIELD OF INVENTION

This invention relates to a Wireless Mobile Entertainment System. This system utilizes a Wireless Audio Device (i.e. tablet, phone, mobile computing device, or other audio or video player) to provide audio to listeners wirelessly through one or more headphones and/or speakers (or combination thereof) designed to work with the Wireless Mobile Entertainment System.

BACKGROUND

Several mobile entertainment systems are currently available. Included in this variety are versions that are permanently mounted in a vehicle, portable self-contained DVD or Blu-ray systems, individual tablets, phones, mobile computing devices, or other audio or video players with wired or wireless headphones.

One such mobile entertainment system version is permanently or semi-permanently mounted in a vehicle, either as a factory installed or aftermarket DVD or Blu-ray system with an integrated screen. These systems generally utilize an infrared (IR) signal to broadcast the audio channels to wireless headphones that users can wear. The infrared (IR) signal provides a robust method to broadcast because the signal is immune to radio frequency or electromagnetic interference that may be encountered on the road and a single transmitter can provide audio to many headphones so multiple users can share a single screen and listen to the same audio.

The disadvantages of the permanently or semi-permanently mounted in-vehicle entertainment systems are that they can be difficult to share between vehicles, requiring uninstallation and reinstallation to switch vehicles. Additionally, the use of DVD and Blu-ray discs requires users to maintain and transport a collection of DVD/Blu-ray discs in order to change what's being watched. Furthermore, these discs can be easily lost and are subject to physical damage—easily being scratched or melted in a hot car.

Another mobile entertainment system version is the Portable DVD/Blu-ray systems using wired headphones. These systems are generally hand held devices that are easily portable between different vehicles, locations, or users.

This version makes it difficult for multiple users to simultaneously share because the systems use wired headphones and rarely have enough headphone connections or output power to drive more than one or two pairs of headphones. Additionally, similar to the permanently or semi-permanently mounted in vehicle entertainment systems the users must maintain a library of DVD or Blu-ray discs, which can be easily lost or damaged.

Utilizing an individual tablet, phone, mobile computing device, or other audio or video player provides a compact entertainment system that eliminates collecting and transporting DVD or Blu-ray disc media or the risk of losing or damaging this media. Many of these devices also have the benefit of being able to play games and often are available with an Internet connection, which provides the ability to stream music or videos, or play interactive games.

As with the Portable DVD/Blu-ray systems these devices are difficult for multiple users to simultaneously share because the systems generally use wired headphones and rarely have enough headphone connections or output power to drive more than one pair of wired headphones. Devices with Bluetooth audio support can utilize wireless Bluetooth headphones for convenience, but since most can only connect to a single Bluetooth audio device it still does not allow multiple users to share. Additionally, Bluetooth headphones often have limited battery life making them not well suited for long periods of watching.

Using one tablet, phone, mobile computing device, or other audio or video player for each person in the vehicle solves many of the challenges of the previous noted systems, however these devices are often much more expensive than the other devices and use of multiple devices can be a very costly solution, even more so if each tablet has an Internet connection with added fees.

Thus, the need exists for solutions to the above problems.

SUMMARY OF THE INVENTION

The system disclosed herein is a device that provides an interface between a source audio signal from a Wireless Audio Device, such as a tablet, phone, mobile computing device, or other audio or video player, and one or more wireless headphones and/or speakers (or combination), so that the audio played from the Wireless Audio Device can be enjoyed wirelessly by multiple users. This interface provides the ease of use and variation of media of a tablet system, with the ability to be shared between multiple users and robustness of the permanently or semi-permanently mounted in vehicle entertainment systems.

DESCRIPTION OF THE PREFERRED EMBODIMENTS

Figure 1:
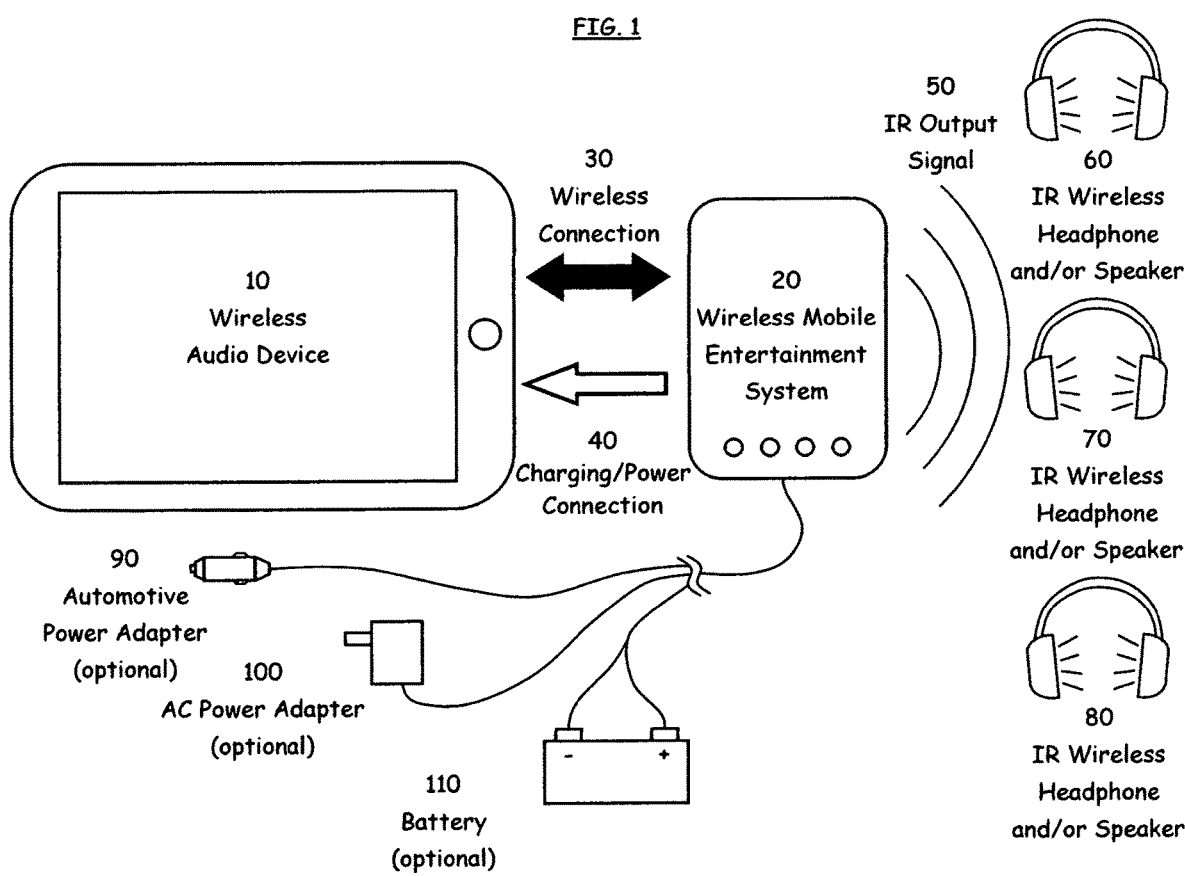
FIG. 1 is an Operational Diagram showing the general connections and communication between the Wireless Mobile Entertainment System, the Wireless Audio Device and the Infrared (IR) Wireless Headphone(s) or speakers.

While this written description of the invention enables one of ordinary skill in the art to make and use what is considered presently to be the preferred embodiment thereof, those of ordinary skill will understand and appreciate the existence of variations, combinations, and equivalents of the specific arrangements, forms, embodiments, methods, and/or examples herein. Therefore, it is to be understood that the invention is not limited in its application to the details of the particular arrangements, forms, embodiments, methods, and/or examples described but by all arrangements, forms, embodiments, methods, and/or examples within the scope and spirit of the invention as claimed since the invention is capable of other arrangements, forms, embodiments, methods, and/or examples.

Further, the terminology used herein is for the purpose of description and not of limitation.

In the Summary of the Invention above and in the detailed Description of the Preferred Embodiments and in the accompanying figures, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the preferred embodiments of the invention shown in the accompanying drawings. This invention may be embodied in many different arrangements, forms, embodiments, methods, and/or examples, however, and should not be construed as limited to the embodiments set forth herein. These embodiments are provided instead so that this disclosure will be thorough and complete, and will convey the scope of the invention to those skilled in the art.

Like numbers refer to like elements throughout, and prime notation may be used if appropriate to indicate similar elements in alternative embodiments.

The system is described in terms of discrete subsystems for clarity; however, the system can be assembled from individual components and/or modules or integrated into a single piece of hardware, or combination of individual components and/or modules, subsystems, other hardware and the like with the same functionality. These components, modules, subsystems and/or other hardware can be commercially available off the shelf solutions for the individual functions, can be purpose built for the specific application, or any combination thereof.

A list of components is shown below.
10 Wireless Audio Device
20 Wireless Mobile Entertainment System
30 Wireless Connection
40 Charging/Power Connection
50 Infrared (IR) Output Signal
60, 70, 80 Infrared (IR) Wireless Headphone(s) or speakers
90 Automotive Power Adapter (optional)
100 AC Power Adapter (optional)
110 Battery (optional)
120 Wireless Interface Subsystem
130 Charging/Power Subsystem
140 Power Supply Subsystem
150 Power Source (Automotive/AC/Battery)
160 Infrared (IR) Transmitter Subsystem
170 Output Infrared (IR) Light Emitting Diodes (LEDs)

FIG. 1 is an Operational Diagram showing the general connections and communication between the Wireless Mobile Entertainment System 20, the Wireless Audio Device 10 and the Infrared (IR) Wireless Headphone(s) 60, 70, 80 and/or speakers (or combination thereof).

Figure 2:
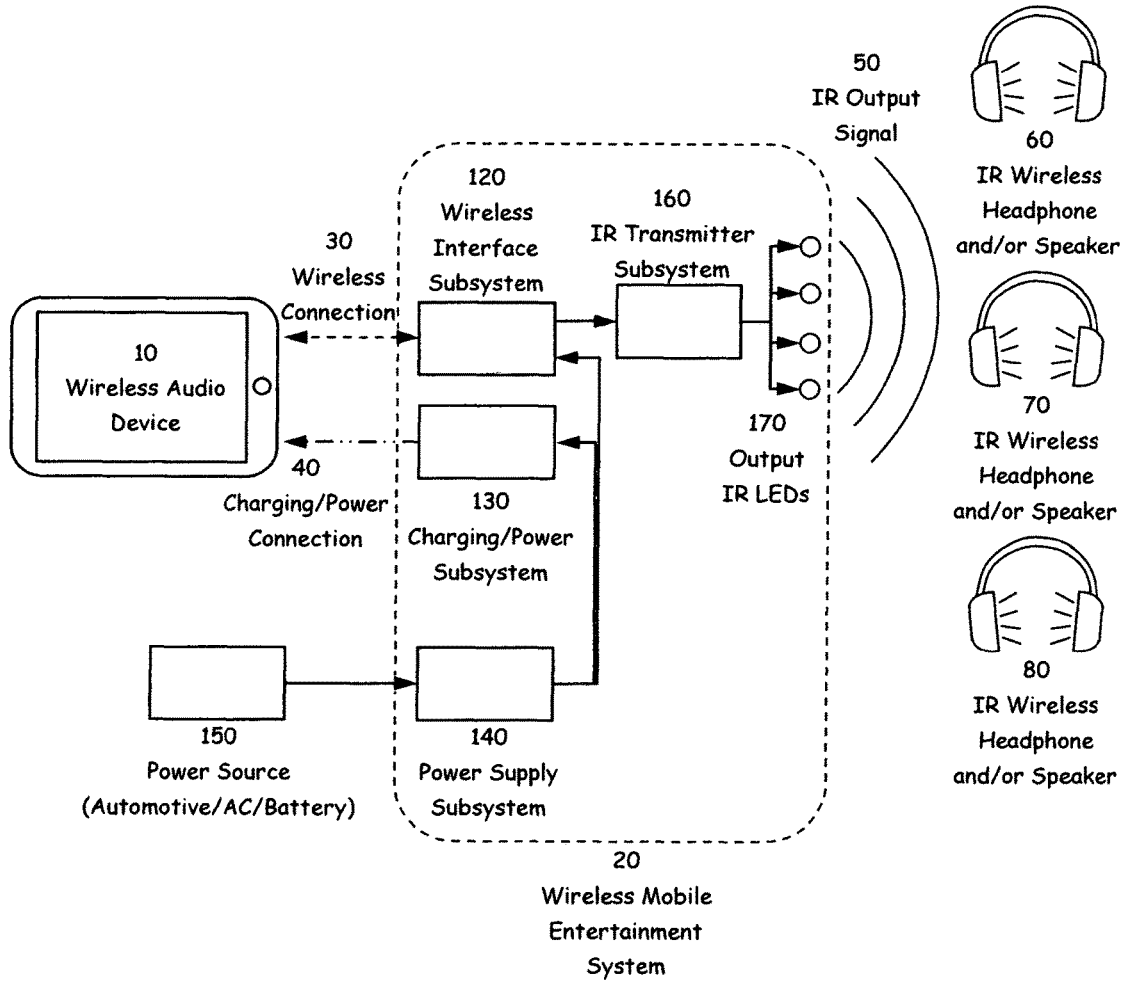
FIG. 2 is a Block Diagram showing the connections and communication between the Wireless Mobile Entertainment System, the Wireless Audio Device and the Infrared (IR) Wireless Headphone(s) or speakers, as well as the connections between the Wireless Interface Subsystem, Infrared (IR) Transmitter Subsystem, Output Infrared (IR) Light Emitting Diodes (LEDs), Charging Subsystem, Power Supply Subsystem, and Power Source.

FIG. 2 is a Block Diagram showing the connections and communication between the Wireless Mobile Entertainment System 20, the Wireless Audio Device 10 and the Infrared (IR) Wireless Headphone(s) 60, 70, 80, and/or speakers (or combination thereof) as well as the connections between the Wireless Interface Subsystem 120, Infrared (IR) Transmitter Subsystem 160, Output Infrared (IR) Light Emitting Diodes (LEDs) 170, Charging/Power Subsystem 130, Power Supply Subsystem 140, and Power Source 150.

The device includes a Wireless Interface Subsystem 120 to communicate with an appropriately equipped Wireless Audio Device 10, such as a tablet or other mobile computing device, via a Wireless Connection 30 over digital or analog, one or two way short range radio communication, such as Bluetooth, Near Field Communications, radio broadcast or the like.

The device includes an Infrared (IR) Transmitter Subsystem 160 to encode the audio signal and drive one or more included Output Infrared (IR) Light Emitting Diodes (LEDs) 170 to create an Infrared (IR) Output Signal 50.

The device uses one or more Infrared (IR) Wireless Headphone(s) 60, 70, 80 and/or speakers (or combination thereof) provided as part of the system, purchased separately, or from a third party supplier to read the Infrared (IR) Output Signal 50 and produce the final audio for the listener to hear.

The device includes a Power Supply Subsystem 140 and Power Source 150, which may include an Automotive Power Adapter 90, AC Power Adapter 100, Battery 110 and/or other, for ensuring consistent, regulated power for the other subsystems.

The device also includes a Charging/Power Subsystem 130 with one or more ports to provide a Charging/Power Connection 40 for charging one or more Wireless Audio Devices 10.

Description of Device Operation

The Wireless Mobile Entertainment System 20 uses a Wireless Interface Subsystem 120 to establish a Wireless Connection 30 to an audio signal source from a Wireless Audio Device 10 via digital or analog, one or two way short range radio communication, such as Bluetooth, Near Field Communication, radio broadcast or similar interface. The audio signal is transmitted to the Wireless Interface Subsystem 120, where it can be directly passed to the Infrared (IR) Transmitter Subsystem 160, or decoded from the appropriate digital or analog signal and re-encoded into the appropriate digital or analog signal and output via digital or analog, one or two way signal to the Infrared (IR) Transmitter Subsystem 160.

The Infrared (IR) Transmitter Subsystem 160 receives the audio signal from the Wireless Interface Subsystem 120. The audio signal can be used directly to drive an output voltage/current to one or more Output Infrared (IR) Light Emitting Diodes (LEDs) 170 or decoded from the appropriate digital or analog signal and re-encoded into the appropriate digital or analog signal to drive an output voltage/current to one or more Output Infrared (IR) Light Emitting Diodes (LEDs) 170 to broadcast the audio as a one or two way, digital or analog Infrared (IR) Output Signal 50. The Output Infrared (IR) Light Emitting Diodes (LEDs) 170 may be wired in series, parallel, or a combination and arranged in a pattern so as to maximize the quality, clarity, and coverage of the broadcast of the Infrared (IR) Output Signal 50 for a specific coverage area or application.

One or more sets of Infrared (IR) Wireless Headphone(s) 60, 70, 80 receive the one or two way, digital or analog communication from the Infrared (IR) Output Signal 50, decode the audio, and output the audio to the listener's ears. The Infrared (IR) Wireless Headphone(s) 60, 70, 80 can be provided with the Wireless Mobile Entertainment System 20, purchased separately, or provide by a third party supplier.

A Charging/Power Subsystem 130 is included with one or more ports such as USB or automotive power socket ports to allow the Wireless Audio Device 10, or other device(s) to be continuously powered and/or charged, via a Charging/Power Connection 40, during use to prolong playing time.

The device can be powered via an Automotive Power Adapter 90 from a vehicles electrical system, via an AC Power Adapter 100 from a buildings power system, or via one Battery 110 or more, either internal or external to the device.

I claim:

1. An entertainment system comprising:
   a wireless audio device (source);
   a wireless communication subsystem for interfacing between wireless audio device; and an infrared audio transmitter; and
   one or more infrared headphones or speakers to output audible tones corresponding to an audio signal originating from the wireless audio device and communicated with the infrared headphones or speakers via wireless communication between the wireless audio device, the wireless communication system, and the infrared headphones or speakers; and
   a power supply for powering the wireless communication subsystem, and any devices connected by the user, such as the wireless audio device and other accessories, with the power supply comprising at least one of an internal battery, an external battery, a connection to a vehicle battery, an external power supply; and
   integrated output power connections in the wireless communication subsystem, comprising at least one of Universal Serial Bus (USB), automotive power socket, direct current power connector, alternating current power pocket or plug, for powering the wireless audio device and other accessories and devices.

2. The system of claim 1 wherein the entertainment system includes:
   a source audio signal from a wireless audio device for playing audio media (recorded audio, video or game soundtrack, or the like) for the listener.

3. The system of claim 1 wherein the entertainment system includes:
   a wireless communication subsystem interfacing with the source audio signal from the wireless audio device via a digital or analog, one or two way short range radio communication method, such as Bluetooth, Near Field Communications, radio broadcast or other digital or analog wireless interface.

4. The system of claim 1 wherein the entertainment system includes:
   a wireless communication subsystem for receiving an audio signal from the wireless audio device, passing the signal on to the infrared audio transmitter, or decode the audio signal from the appropriate digital or analog audio signal format and re-encoded the audio signal to the appropriate digital or analog signal format, and transmit the audio signal to the infrared audio transmitter.

5. The system of claim 1 wherein the entertainment system includes:
   an infrared audio transmitter subsystem for receiving an audio signal from the wireless communication subsystem and directly broadcasting the audio signal as a digital or analog infrared transmission from the wireless communication subsystem to the infrared headphones or speakers, or decode the audio signal from the appropriate digital or analog audio signal format and re-encoded the audio signal to the appropriate digital or analog signal format and broadcasting the audio signal as a digital or analog infrared transmission from the wireless communication subsystem to the infrared headphones or speakers.

6. The system of claim 1 wherein the entertainment system includes:
   one or more wireless headphones and/or speakers (or combination thereof) to receive the infrared broadcast audio signal from the infrared audio transmitter subsystem, decode the digital or analog infrared transmission, and play the audio for the listener to hear via headphones and/or speakers.

* * * * *